April 23, 1940.  H. B. JOHNSON  2,197,864
PROCESS OF ELECTROSTATIC SEPARATION
Filed July 3, 1937  7 Sheets-Sheet 1

Inventor:
Herbert B. Johnson

April 23, 1940.   H. B. JOHNSON   2,197,864
PROCESS OF ELECTROSTATIC SEPARATION
Filed July 3, 1937   7 Sheets-Sheet 2

Inventor:
Herbert B. Johnson

April 23, 1940.   H. B. JOHNSON   2,197,864
PROCESS OF ELECTROSTATIC SEPARATION
Filed July 3, 1937    7 Sheets-Sheet 3

Inventor
Herbert B. Johnson.

April 23, 1940. H. B. JOHNSON 2,197,864
PROCESS OF ELECTROSTATIC SEPARATION
Filed July 3, 1937 7 Sheets-Sheet 4

Inventor
Herbert B. Johnson.

Fig. 12.

Inventor:
Herbert B. Johnson.

Fig. 13.

Patented Apr. 23, 1940

2,197,864

UNITED STATES PATENT OFFICE 2,197,864

PROCESS OF ELECTROSTATIC SEPARATION

Herbert B. Johnson, Rochester, N. Y., assignor to Ritter Products Corporation, Rochester, N. Y., a corporation of New York Application July 3, 1937, Serial No. 151,950

20 Claims. (Cl. 106—25)

This invention relates, generally, to the special application of improved electrostatic separation (a dry process) used for the separation, concentration and recombination of associated minerals found in rocks, shales, marls and the like and various by-products which are suitable for raw cement mixes used in the production of cement products and made to standard and special specifications and, in particular to the processing of the cement quarry rocks located in the Chester Valley and Lehigh Valley districts in the State of Pennsylvania.

The problem of selecting, separating and recombining minerals for the manufacture of cement really begins with any cement manufacturer from the time the source of raw materials is selected and the plant is located, preferably with easy access and low transportation cost to outside sources of supply of fuel, limestone, iron and other minerals. The art of selecting, separating and recombining minerals used in the manufacture of cement, particularly Portland cement, is well known throughout the industry. Marketable cement is produced from low grade quarry rocks, shales, marls and the like, as well as from waste materials, such as blast furnace slag, boiler ash and the tailings or waste products from concentrating mills, which have previously been separated by mechanical means from copper, zinc, iron, gold, silver and many other ores by well known methods of separation and concentration, such as air separators, wet tables and flotation, employing both wet and dry methods of concentration.

The separation of hard minerals, such as quartz, from the softer minerals by the usual grinding and air flotation methods is well known to the manufacturers of Portland cement products. Silica, in the form of silicates, readily combines with the $CaCO_3$ minerals in burning or clinkering operations, while free silica (hard quartz) does not so readily combine.

In many foreign countries and in many sections of the United States, particularly in Pennsylvania, New Jersey and New York, cement manufacturers for years have been purchasing additional limestone, iron and other minerals and recombining them for raw cement mixtures. Many plant operations have been abandoned because the cost of purchasing these minerals and the transportation expense involved have made operations unprofitable. In the Lehigh Valley and the Chester Valley districts, in the State of Pennsylvania, the average cost of additional lime, at the present time, is approximately 5½¢ per barrel of cement produced. In some cases where additional iron is also required, the combined cost is advanced to 12¢ or 15¢ per barrel of cement produced. Therefore, the cement manufacturer is vitally concerned with the careful planning of his mining operations and is governed principally by drill hole analysis and, naturally is compelled to select his highest grade raw material, regardless of best mining procedure, in order to control his production cost and maintain profitable operating conditions.

Manufacturers of cement and engineers in control of operations have continuously made every effort to locate some method of direct mechanical concentration and, preferably, a dry process because of its lower cost, which would satisfactorily and economically separate the minerals present in the cement raw materials, thereby simplifying and reducing the mining cost as well as securing much better control of the raw mixes. In 1933 cement plants in the United States were divided by processes used as follows:

Wet process mills: 47.6%
Dry process mills: 52.4%

Wet process cement production: 46.4% of total
Dry process cement production: 53.6% of total Many operators of dry process cement plants cannot afford to convert their operations to a wet process method. In many cases, it would mean practically a complete redesign of their mills and power plants. Few of them have the additional power or heat available to dry the separated products that are produced by wet methods of concentration. It is questionable whether the wet process can be successfully applied to dry process plants with any reduction in operating expense. Therefore, the operators of dry process plants are practically dependent upon the development of a low cost dry process for the separation of the minerals that are found in their sources of raw material supply.

In the Lehigh Valley and Chester Valley, particularly, a cement company producing two million barrels of finished cement yearly will purchase from outside sources, limestone valued at approximately—$100,000.00. If such a company installed the wet process of concentrating its quarry rock, thereby controlling the alumina content and increasing the lime content up to desired specifications by eliminating the excess silica and other minerals, the saving made in limestone purchases would be largely offset by the additional cost of drying the wet separated products prior to clinkering operations. For example, using a hundred foot kiln with a dry mix averaging 2.5% water, the B. t. u. consumption per barrel of cement is 21,097. A wet mix, averaging 60% water, requires 1,113,840 B. t. u. per barrel of cement. Many dry process plants cannot afford the cost of increasing the size of their present kilns to the extent required to evaporate the water in the wet process. For the wet process the drying cost averages approximately 20 lbs. of coal per barrel of finished cement product or for the particular plant mentioned 20,000 tons of coal is required yearly at a cost of approximately $100,000.00. Therefore, the only gain by the cement manufacture in the use of the wet process is better control of his raw mixes and independence of outside sources of supply. There is, of course, the possibility of meeting higher market price cement specifications.

The object of the invention, as generally stated, is to provide a new process for manufacturing cement that will be simple and efficient in operation and which may be readily and economically employed.

The principal object of the invention is to provide a dry process to meet the requirements of dry process cement plants. After long and careful investigation it has been decided that the electrostatic principle of separation is the proper basic principle to apply for obtaining the lowest operation cost. The use of this dry separation process eliminates the cost incident to the purchase of limestone and also the extra drying cost required when the wet process is used. The cement manufacturer with a yearly production of 2,000,000 barrels of cement using the dry process disclosed herein will, therefore, receive a profit of approximately $100,000.00 yearly or a saving of this amount from which only the actual separating equipment cost and operation cost need be deducted.

Many different samples and types of cement raw materials, particularly from the Lehigh Valley district, have been considered and in experimental work including microscopic examinations and chemical analyses a peculiarity has been revealed regarding the minerals found which has never been known or appreciated before and which is believed to be a new and valuable discovery inasmuch as it provides a very positive separation control of the minerals involved, which control has not heretofore been considered possible. At the beginning of the investigations on cement raw materials and waste materials used in the manufacture of cement products tests were very discouraging until it was discovered how to control the separation of the minerals involved through their previously unknown electrical conductivity characteristics.

Most technical publications and text books list both $CaCO_3$ and $SiO_2$ minerals as poor conductors and, in some descriptions, non-conductors of electricity. Despite this fact it is possible to show a marked difference in the conductivity of $CaCO_3$ and $SiO_2$ minerals and to employ this difference by reversing the electrostatic field applied between two revolving electrodes, one of which is used for conveying finely divided cement rock into the separating electrostatic field.

Another object of the invention is to employ this new discovery in providing a high degree of flexibility in the separating of the various mineral groups found in cement raw materials, principally the $CaCO_3$ group and the $SiO_2$ group, so that different cement specifications can be readily met without requiring a long delay from the time that it is desired to alter the separation obtained.

In the practical operation of a cement plant it is necessary to be able to meet different cement specifications in order to be able to compete with other cement manufacturers. At the same time these different cement specifications must be met from the quarry rock that is available. Since the chemical analysis of this rock varies, the difficulties encountered in meeting these different cement specifications are further increased.

Therefore, an important object of the invention is to provide a process for manufacturing cement in which the quarry rock is processed in accordance with its varying chemical analysis and without particular regard to a final product and in which different cement specifications can be met without requiring any change in the processing of the raw cement minerals.

Other objects of the invention will, in part, be obvious and in part appear hereinafter.

The invention, accordingly, is disclosed in the embodiments hereof shown in the accompanying drawings, and it comprises the various process steps and features of construction which will be described hereinafter and the scope of the application which will be indicated in the appended claims.

For a complete understanding of the nature and scope of the invention, reference may be had to the following detailed description taken in connection with the accompanying drawings, in which:

Figures 1, 2, 3 and 44 illustrate diagrammatically the various separations that may be obtained with the electrostatic field acting in opposite directions;

Figures 1, 2, 3, 4:
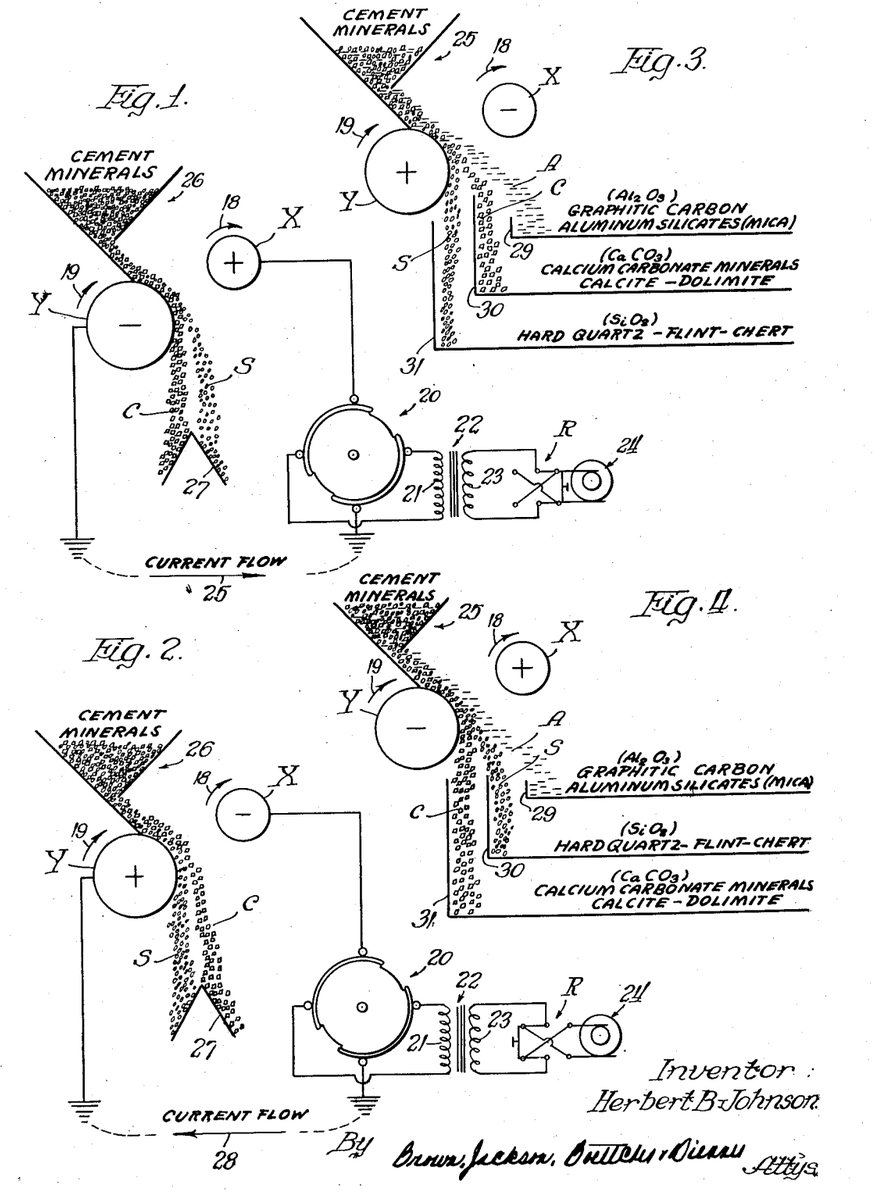

Referring now to Figure 1 of the drawings it will be observed that a pair of electrodes X and Y is provided and they are arranged to be rotated in the directions indicated by the arrows 18 and 19. The electrodes X and Y may form a part of an electrostatic separating machine such as that disclosed in the copending application of Herbert B. Johnson, Serial No. 128,097, filed February 27, 1937. The electrodes X and Y are generally cylindrical in shape and are preferably relatively long, for example, from 6 to 8 feet long. The electrodes X and Y may be maintained at a high difference of uni-directional voltage by a suitable source of direct current such as the mechanical rectifier shown generally at 20. The mechanical rectifier 20 may be connected for energization to the high voltage winding 21 of a transformer, shown generally at 22, having a primary winding 23 that may be connected for energization to a suitable alternating current source 24, such as a sixty cycle source. A reversing switch R is provided for reversing the connections between the primary winding 23 and the alternating current source 24. In this embodiment of the invention the reversing switch R is operated to such position that the electrode X is maintained at a positive potential with respect to the electrode Y. The electrode X may then be considered the positive electrode and the electrode Y may be considered the negative electrode. Under these conditions charging or electrostatic current flows as indicated by the arrow 25.

The cement minerals to be separated may be positioned in a suitable hopper, shown generally at 26, which is arranged to feed them onto the electrode Y as shown. Since this electrode conveys the cement minerals into the electrostatic field between the two electrodes it may also be termed the material carrying electrode. When a voltage of from 8000 to 20,000 volts is applied across the electrodes X and Y with the polarities as indicated. the cement minerals will be separated into two general groups which may be termed the $CaCO_3$ group, represented by the reference character C and the $SiO_2$ group, represented by the reference character S. The $CaCO_3$ group will be attracted to the negative electrode Y while the $SiO_2$ group will be repelled therefrom to such an extent that the two groups may be separated by the divider 27.

In Figure 2 of the drawings the equipment shown in Figure 1 is provided but in this embodiment of the invention the reversing switch R is thrown to the opposite position so that the polarities of the electrodes X and Y are reversed. In this case the material carrying electrode Y is positive and the other electrode X is negative. Charging or electrostatic current then flows in the direction indicated by the arrow 28. Now when this arrangement of polarities is employed the separation of the $CaCO_3$ group and the $SiO_2$ group is reversed. The $SiO_2$ group, represented by the reference character S is attracted to the positive electrode Y while the $CaCO_3$ group, represented by the reference character C, is repelled therefrom. Advantage is taken of this separation to collect the two groups individually by the divider 27 and suitable associated apparatus.

While the $CaCO_3$ group and the $SiO_2$ group of minerals are important and constitute a major portion of the cement minerals, they do not constitute all of the minerals that are present. Additional minerals may comprise an $Al_2O_3$ group, graphitic carbon, aluminum silicates and the like. It is then found that this latter general group of minerals is unaffected by the reversal of the polarities of the electrodes X and Y.

As shown in Figure 3 of the drawings the separation of the $CaCO_3$ group and the $SiO_2$ group is the same as shown in Figure 2. The $Al_2O_3$ group and associated minerals may be represented by the reference character A and this group is repelled further from the material carrying electrode Y than is the $CaCO_3$ group. The three groups may then be individually collected by means of dividers 29, 30 and 31 into the groups as indicated.

Now when the polarities of the electrodes X and Y are reversed, as shown in Figure 4 of the drawings, the separation of the $SiO_2$ group and the $CaCO_3$ group is as shown in Figure 1. That is, the $CaCO_3$ group remains close to the negative electrode Y while the $SiO_2$ group is repelled at such a distance that the two groups may be individually collected. However there is no change in the positioning of the $Al_2O_3$ group and associated minerals so that it may be individually collected as shown in Figure 3.

By employing these principles of separation in suitable combinations it is possible to provide a highly flexible control of the manufacture of cement and at the same time provide suitable combinations of minerals that may be combined as desired to meet substantially any cement specifications that may be proposed. Once the various separations are obtained it is readily possible for the cement chemist to combine the various separated groups as desired to meet the particular specifications submitted to him.

While the mechanical rectifier 20 has been illustrated as providing a suitable source of high voltage for energizing the electrodes X and Y at opposite polarities, it will be understood that any other suitable source may be employed such as the combination of an alternating current source and a rectifier formed by electric valves connected suitably as is well known to those skilled in the art.

As indicated when the polarities of the electrodes X and Y are reversed, there is little difference in the effect on the mineral group A. There is, however, a wide difference in effect on the minerals in groups S and C. When the polarities shown in Figure 4 are employed it has been found that a relative lower voltage is required to get the same degree of separtion that is obtained when the polarities as shown in Figure 3 are employed. That is, in order to effect the same degree of separation with the polarities of Figure 3 it is necessary to use from 3000 to 5000 volts more than is required for the polarities shown in Figure 4. However, to meet certain specifications it may be desirable to use the reversed polarity from that shown in Figure 4.

When the polarities shown in Figure 4 are employed it has been found that a very good separation is obtained between free silica (quartz) and the silica in the form of silicates. This has many advantages since the free silica (quartz) does not readily combine with the lime in clinkering operations as do the silicates. The free $SiO_2$ product (hard quartz) may be rejected or separately reground to any fineness specification desired before recombining with raw mixes going to kiln storage bins.

It will be understood that it will ordinarily be necessary to employ more than a single pair of electrodes X and Y in order to effect the desired degree of separation. That is, the percentage of the total $SiO_2$ product that is separated from the original cement minerals by passing them between a single pair of electrodes X and Y will be relatively small. By passing the cement minerals successively between a plurality of pairs of electrodes, it is possible to increase the degree of separation and, for example, the amount of $SiO_2$ or $CaCO_3$ that is separated out of the raw cement minerals.

Figures 5, 6:
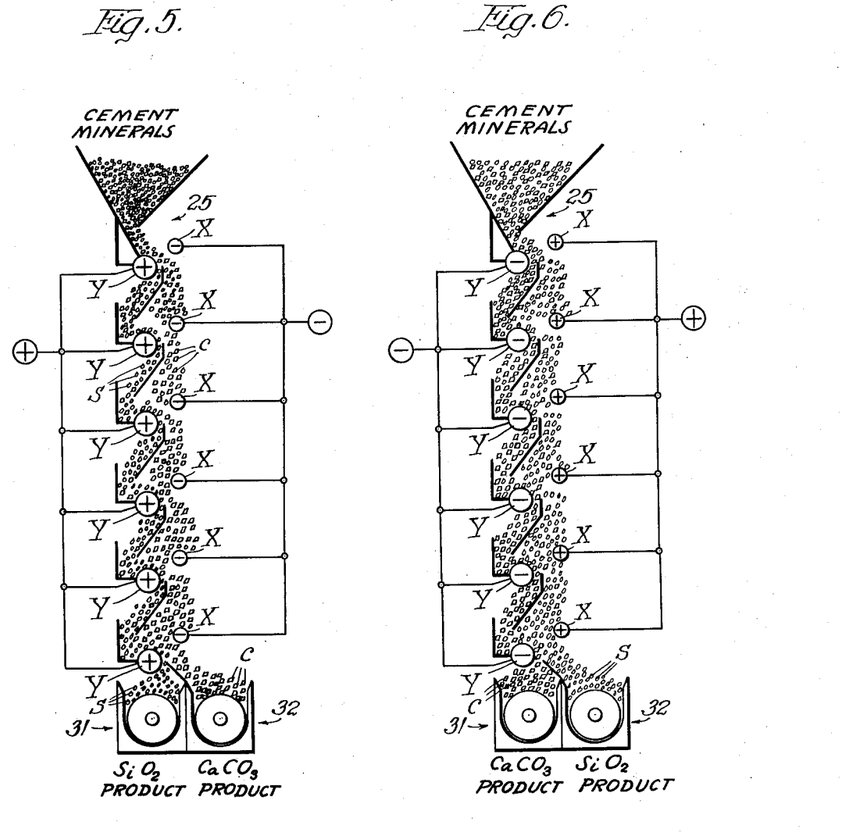
Figures 5, 6, 7 and 8 illustrate, diagrammatically, the separating characteristics that may be obtained when either a plurality of electrostatic fields are employed acting oppositely in different separators or acting oppositely in the same separator.

For this purpose the arrangement illustrated diagrammatically in Figure 5 of the drawings may be employed. As there shown a plurality of pairs of electrodes X and Y is provided and so connected that the X electrodes are negative and the Y or material carrying electrodes are positive. In this embodiment of the invention the $CaCO_3$ product is repelled from the positive electrodes Y and it is separted from the remainder by suitable dividers as shown. The balance of the material is then fed onto the next positive electrode and the separation is repeated, removing more and more of the $CaCO_3$ product as the balance of the material passes between each successive pair of electrodes. Product conveyors, shown generally at 31 and 32 may be provided below the pairs of electrodes X and Y for individually collecting and conveying away the separated portions.

In Figure 6 of the drawings an arrangement is illustrated diagrammatically that is similar to that shown in Figure 5 except that the polarities of the electrodes X and Y are reversed. In this embodiment of the invention the electrodes X are positive and the electrodes Y are negative. This results in a reversed separation so that here the $SiO_2$ product is repelled away from the negative electrodes Y and it is collected, as shown, in the product conveyor 32. The $CaCO_3$ product is individually collected and carried away by the product conveyor 31.

For most cement rocks and other materials that have been tested, which may be used for the manufacture of Portland cement, it is preferred to employ the polarities shown in Figure 6. This is particularly true where it is essential to effect a high concentration of the $Al_2O_3$. Furthermore this arrangement simplifies the separation by requiring a less number of pairs of electrodes, thereby reducing the cost of equipment to handle a given tonnage of cement minerals.

In order to meet certain specifications it may be desirable to process the cement minerals through a separator that is provided with two or more groups of pairs of electrodes, one pair being maintained with the electrostatic field between them in one direction and the other group of electrodes being so energized that the electrostatic field between them is in the opposite direction.

Figure 7:
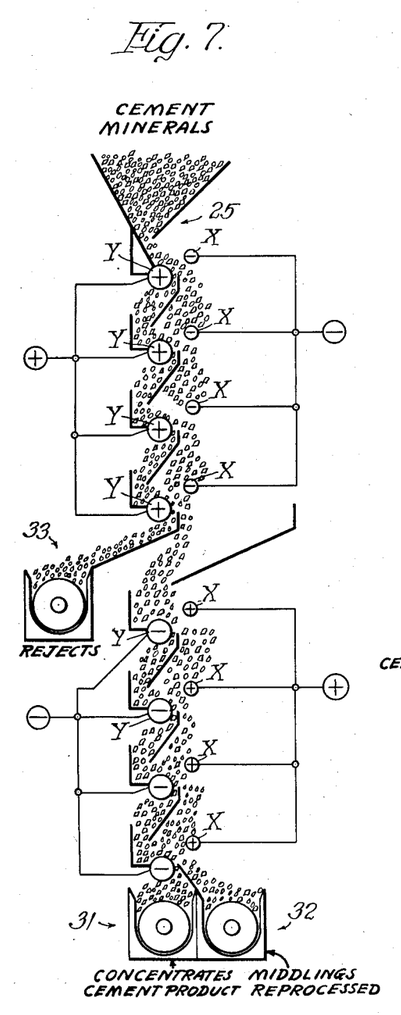

One example of such a construction is illustrated in Figure 7 of the drawings. As there illustrated, the first four pairs of electrodes are so energized that the X electrodes are negative while the Y or material carrying electrodes S are positive. A considerable portion of the $SiO_2$ product will be separated out of the cement minerals and may be conveyed to waste or otherwise by the material conveyor 33. The balance of the minerals are then successively passed through four pairs of electrodes which are energized oppositely from the first four pairs of electrodes. As shown, the X electrodes are positive while the Y or material handling electrodes are negative. A middling product is then repelled while the concentrates or high lime product is collected in the product conveyor 31. The middlings are collected in the product conveyor 32 and may be returned for reprocessing.

With a view to illustrating the advantages of the present invention certain comparative data will be set forth showing how a crude rock having a relatively low lime content can be used without the addition of limestone to make a highly desirable cement product. The following table sets forth an analysis of crude rock that may be used for illustrative purposes:

(1)

| | Per cent |
|---|---|
| $SiO_2$ | 13.92 |
| $Al_2O_3$ | 4.96 |
| $Fe_2O_3$ | 1.54 |
| $CaCO_3$ | 72.44 |

Using crude cement rock of this analysis and calculating the ignition lost to be 34.20 per cent, this material, when clinkered, would have the following analysis:

(2)

| | Per cent |
|---|---|
| $SiO_2$ | 21.70 |
| $Al_2O_3$ | 7.54 |
| $Fe_2O_3$ | 2.34 |
| CaO | 61.70 |

Assuming that 100 lbs. of coal per barrel are used in clinkering this material and that this coal will produce 10 per cent ash of the following composition:

(3)

| | Per cent |
|---|---|
| $SiO_2$ | 33.0 |
| $Al_2O_3$ | 22.0 |
| $Fe_2O_3$ | 19.0 |
| CaO | 13.0 | with a ratio of approximately one part coal ash of this analysis to thirty-seven parts cement of clinker analysis of Table 2, the analysis after burning would be as follows:

(4)

| | Per cent |
|---|---|
| $SiO_2$ | 21.99 |
| $Al_2O_3$ | 7.91 |
| $Fe_2O_3$ | 2.77 |
| CaO | 60.39 |

When gypsum is added, the lime content shown in Table 4 will be reduced approximately 2 per cent and this cement would have a calculated tricalcium silicate composition of 14 per cent. It will be obvious that it would be impossible to manufacture from a crude rock having the analysis set forth in Table 1 a satisfactory cement that would be capable of meeting standard specifications unless high grade limestone were added.

However, when the crude rock having the analysis set forth in Table 1 is processed by apparatus such as illustrated diagrammatically in Figure 7 of the drawings and suitably recombined, it is possible to make a satisfactory cement material. The following table shows the chemical analysis of the materials being processed at various points:

(5)

| | $SiO_2$ | $Al_2O_3$ | $Fe_2O_3$ | $CaCO_3$ |
|---|---|---|---|---|
| | Percent | Percent | Percent | Percent |
| Crude rock analysis | 13.92 | 4.96 | 1.54 | 72.44 |
| Concentrates | 10.98 | 4.10 | 1.38 | 79.38 |
| Middlings | 20.80 | 4.66 | 2.38 | 60.32 |
| Rejects | 38.78 | 8.12 | 1.78 | 53.27 |

It will be observed that the crude rock being processed has the same analysis as the crude rock in Table 1. The concentrates which are collected in the product conveyor 31 may be combined with crude rock dust to give a mix containing 76 per cent $CaCO_3$. In order to obtain this mixture the recombination can be made with 56 per cent rock dust and 44 per cent concentrates as shown in the following table.

(6)

| | Original rock dust (56 parts) | Concentrates (44 parts) | Raw material mixture (100 parts) |
|---|---|---|---|
| | Percent | Percent | Percent |
| $SiO_2$ | 13.56 | 10.98 | 12.43 |
| $Al_2O_3$ | 5.12 | 4.10 | 4.67 |
| $Fe_2O_3$ | 1.98 | 1.38 | 1.72 |
| CaO | 41.00 | 44.42 | 42.56 |
| $CaCO_3$ | (73.35) | (79.38) | (76.00) |
| Loss | | | 35.50 |

When clinkered, this mix gives a clinker of the following composition:

(7)

| | Per cent |
|---|---|
| $SiO_2$ | 19.27 |
| $Al_2O_3$ | 7.24 |
| $Fe_2O_3$ | 2.67 |
| CaO | 65.97 |

Allowing for coal ash mixture during burning in the proportions of 37 parts clinker to one part coal ash, the final analysis of the clinker would be (8)

| | Per cent |
|---|---|
| SiO₂ | 19.63 |
| Al₂O₃ | 7.62 |
| Fe₂O₃ | 3.09 |
| CaO | 64.59 |

Addition of gypsum and absorption of moisture will reduce the lime content to approximately 63 per cent. A cement of this composition would have a calculated tri-calcium silicate content of 52 per cent. It will be noted that cement of this composition will have excellent strength characteristics which are considerably above standard specifications, although the cement has been produced from a raw material which was previously considered unsuitable for cement manufacture without being enriched in CaCO₃ content by the addition of high grade limestone.

Figure 8:
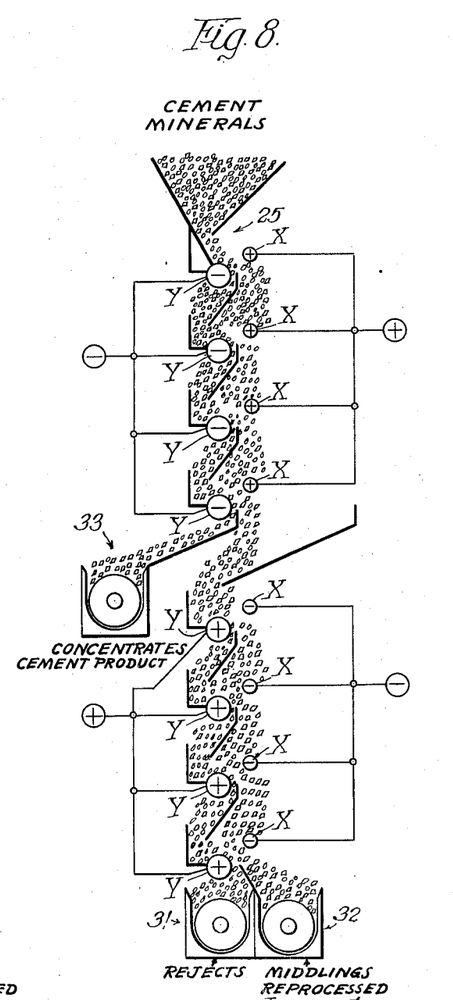

In Figure 8 of the drawings another embodiment of the invention is illustrated in which two sets of oppositely energized electrodes are employed. The first four pairs of electrodes are so energized that the X electrodes are positive and the Y or material carrying electrodes are negative. A cement product is then obtained in the product conveyor 33 and the balance of the material is then successively subjected to the next set of electrodes which are so energized that the X electrodes are negative and the Y or material carrying electrodes are positive. This balance of the cement minerals is separated into rejects and middlings. The former is received and conveyed away by the product conveyor 31 while the latter is received and conveyed away by the product conveyor 32 and preferably it is returned to be reprocessed.

Using the crude rock having the analysis as shown in Table 1 in the separating equipment arranged as shown in Figure 8 of the drawings the following table indicates the analysis of the minerals at the various points:

(9)

| | SiO₂ | Al₂O₃ | Fe₂O₃ | CaCO₃ |
|---|---|---|---|---|
| | Percent | Percent | Percent | Percent |
| Crude rock analysis | 13.92 | 4.96 | 1.54 | 72.44 |
| Concentrates | 7.94 | 2.55 | 1.19 | 83.44 |
| Middlings | 15.92 | 6.92 | 2.18 | 67.53 |
| Rejects | 26.80 | 6.24 | 1.58 | 59.76 |

The concentrates obtained by this separation are relatively high in CaCO₃ content. The concentrates having this analysis may be combined with rock dust removed in the crushing operations to give a mix containing 76.00 per cent CaCO₃. To obtain this mixture it is only necessary to combine in the proportions of 74 per cent dust and 26 per cent concentrates as shown in the following table:

(10)

| | Original rock dust (74 parts) | Concentrates (26 parts) | Raw material mixture (100 parts) |
|---|---|---|---|
| | Percent | Percent | Percent |
| SiO₂ | 13.56 | 7.94 | 12.08 |
| Al₂O₃ | 5.12 | 2.55 | 4.44 |
| Fe₂O₃ | 1.98 | 1.19 | 1.77 |
| CaO | 41.00 | 46.73 | 42.56 |
| CaCO₃ | (73.35) | (83.44) | (76.00) |
| Loss | | | 35.50 |

When clinkered this mix gives a clinker having the following analysis:

(11)

| | Per cent |
|---|---|
| SiO₂ | 18.72 |
| Al₂O₃ | 6.88 |
| Fe₂O₃ | 2.74 |
| CaO | 65.97 |

Allowing for coal ash composition in the proportions of 37 parts clinker to one part coal ash the final analysis of the clinker would be (12)

| | Per cent |
|---|---|
| SiO₂ | 19.09 |
| Al₂O₃ | 7.27 |
| Fe₂O₃ | 3.16 |
| CaO | 64.59 |

Addition of gypsum and absorption of moisture will reduce the lime content of this analysis to approximately 63 per cent. A cement of this composition would have a calculated tri-calcium silicate of 64 per cent. It will be noted that a cement of this composition approaches the range of high lime, high early strength cement.

If it is desired to make a cement having relatively high Al₂O₃ content the separating arrangement shown in Figure 7 may be employed and, as shown in Table 5, for the given crude rock analysis the Al₂O₃ in the concentrates is 4.10 per cent. For the same material when the separating arrangement shown in Figure 8 is employed a smaller Al₂O₃ content of the concentrates is obtained. As shown in Table 9 the Al₂O₃ content of the concentrates is 2.55 per cent.

It will be understood that these data have been given merely by way of illustration and to point out the different results that may be obtained and the high degree of flexibility. It will be understood that two or more sets of pairs of electrodes may be employed and that a greater or lesser number in each set may be employed. Likewise each set may be individually energized from a suitable source of uni-directional voltage with suitable reversing switches for reversing the polarities of the electrodes as desired. With such an arrangement it is readily possible to selectively adjust the separation that is obtained, not only by varying the polarity, but also by varying the voltage that is used. For any particular application and cement specifications the necessary combinations of polarities and voltages may be readily worked out to suit the special conditions involved. It is further pointed out that it is advantageous to have the sets of pairs of electrodes located one above the other so that a continuous flow of the minerals being processed may be had together with very close control of the separation.

It is, of course, possible to connect both sets of pairs of electrodes so that the electrostatic fields will all be in the same direction. For example, referring to Figure 7, the polarities of the electrodes of the upper set may be reversed so that all of the X electrodes will be positive. The following table illustrates the separation that is obtained when a crude rock having the analysis set forth in Table 1 is employed:

(13)

| | SiO₂ | Al₂O₃ | Fe₂O₃ | CaCO₃ |
|---|---|---|---|---|
| | Per cent | Per cent | Per cent | Per cent |
| Crude rock analysis | 13.92 | 4.96 | 1.54 | 72.44 |
| Concentrates | 7.94 | 2.55 | 1.19 | 83.44 |
| Rejects | 23.72 | 6.90 | 1.78 | 61.70 |

For this separation the SiO₂, Al₂O₃ and Fe₂O₃ are found principally in the rejects and will be collected in the product conveyor 32. The CaCO₃ is found principally in the concentrates and would be collected in the product conveyor 31. For this separation the product conveyor 33 and associated divider would be removed.

Now when the electrostatic fields are completely reversed, for example, by reversing the X electrodes of the upper set shown in Figure 8, and using a crude rock having this same analysis, a separation is obtained as indicated in the following table:

(14)

|  | SiO₂ | Al₂O₃ | Fe₂O₃ | CaCO₃ |
|---|---|---|---|---|
|  | Per cent | Per cent | Per cent | Per cent |
| Crude rock analysis | 13.92 | 4.96 | 1.54 | 72.44 |
| Concentrates | 10.90 | 4.68 | 1.28 | 78.32 |
| Rejects | 38.78 | 4.66 | 1.78 | 53.27 |

For this separation the concentrates containing principally CaCO₃ will be collected in the product conveyor 32, while the rejects containing principally SiO₂ and Fe₂O₃ will be collected in the product conveyor 31. It will be observed that there is practically no concentration of Al₂O₃ in either of the separated portions.

A comparison of the separation that is obtained when all of the X electrodes are negative as compared with that obtained when all of them are positive clearly shows the reversed separating effect. Table 13 shows that a concentrate having a high CaCO₃ will be collected in the product conveyor 31 while, when the reversed polarity is employed, a concentrate having a high percentage of CaCO₃ is collected in the product conveyer 32. By combining these effects as desired it is possible to closely control the processing of the cement minerals.

The principle of electrostatic separation may be introduced into the flow sheet of a cement mill as may be desired. For purposes of illustration several flow sheets have been illustrated in Figures 9 through 13.

Figure 9:
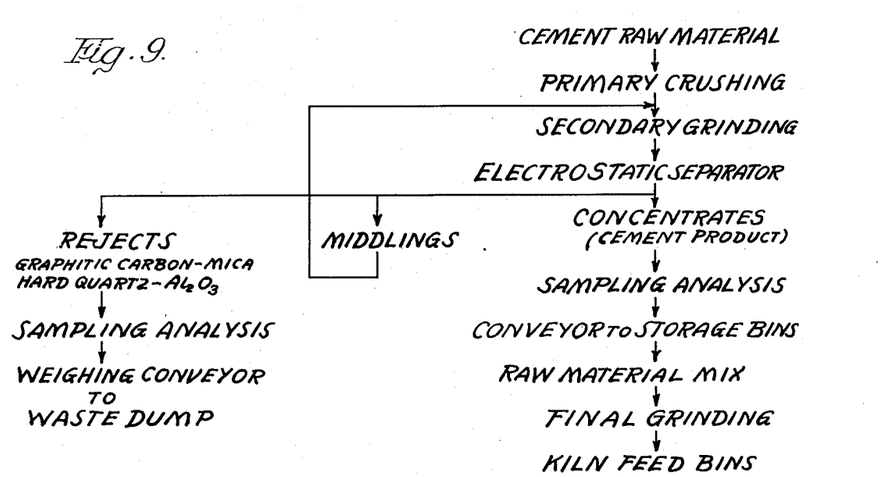
Figures 9, 10, 11, 12 and 13 show different flow sheets that may be employed in practicing the invention.

As shown in Figure 9 the electrostatic separation is so arranged as to treat the entire raw material after it has been suitably reduced in size by crushing and grinding it. By this means the finely divided raw material is separated into rejects, middlings and concentrates. The middlings are returned to be reground and reprocessed. The rejects may be discarded if desired. The concentrates are further processed in accordance with standard cement mill practice.

Figure 10:
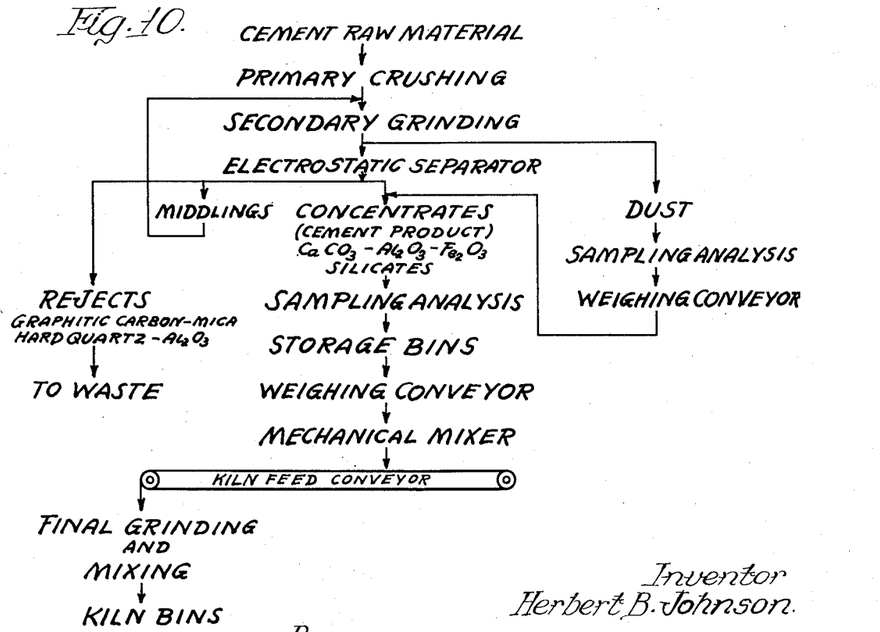

In Figure 10 of the drawings it will be observed that the dust is removed from the cement minerals before they are put through the electrostatic separation step. As before the electrostatic separator separates the balance of the cement minerals into rejects, middlings and concentrates. The rejects may be discarded while the middlings are returned to be reground and reprocessed. As indicated hereinbefore the dust and the concentrates may be combined in suitable proportions to meet different cement specifications.

It is desirable to thoroughly mix the dust and concentrates. For this purpose a final grinding and mixing step is introduced before the product is sent to the kiln bins. This additional step not only reduces the cement product to final size but, by virtue of the grinding process, an intimate mixture is obtained. This step is believed to be new in cement mill practice.

Figure 11:
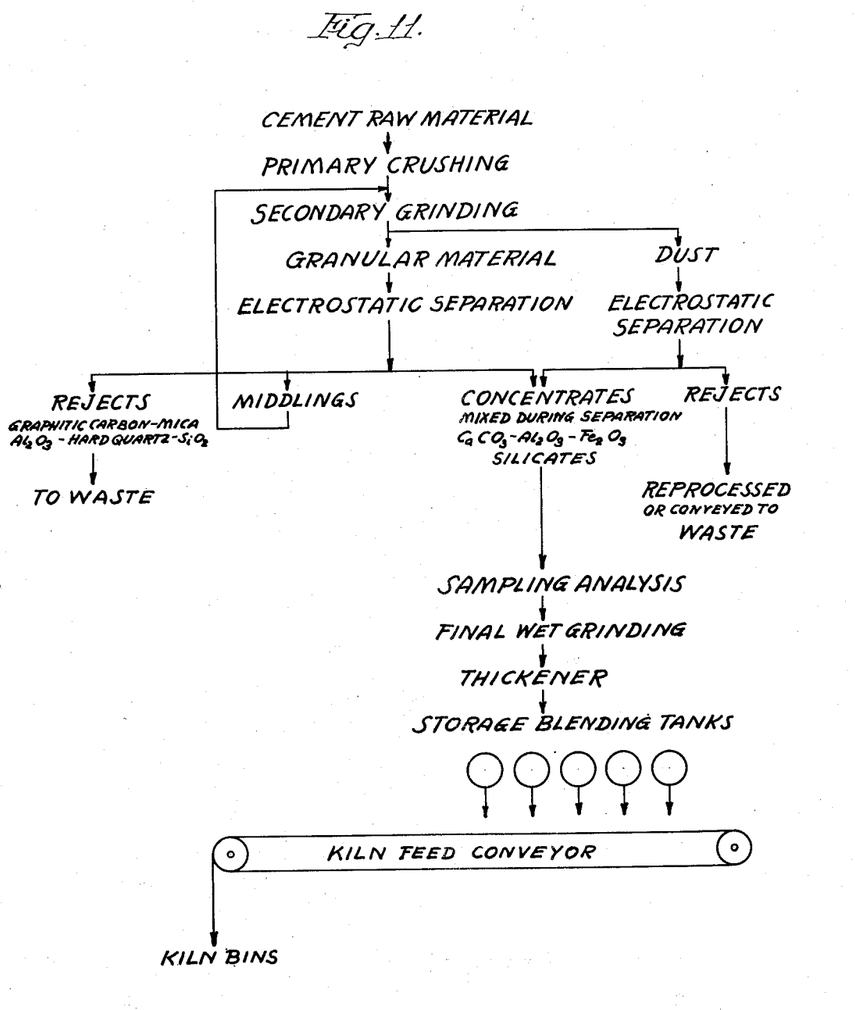

In Figure 11 of the drawings it will be observed that both the finely divided raw material and the dust are electrostatically separated. The concentrates from each electrostatic separation are suitably combined to meet different cement specifications. If desired a final wet grinding step may be incorporated as illustrated, to thoroughly mix the products involved as well as to reduce them to the desired size. After the final wet grinding the material passes through the thickener and then to the various storage blending tanks as desired. To meet various specifications the material from the various tanks may be withdrawn onto the kiln feed conveyor and conveyed to the kiln bins in accordance with the standard cement practice.

Figure 12:
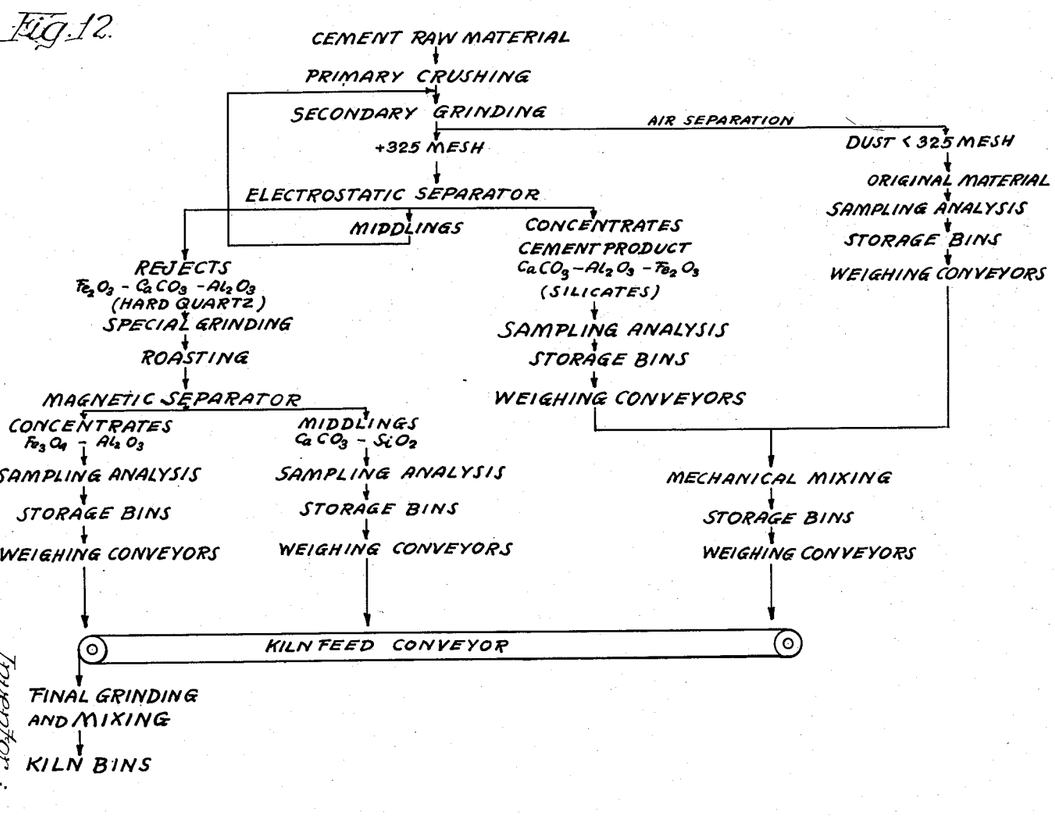

As shown in Figure 12 the concentrates from the electrostatic separation and the dust are suitably combined to form a product that may be combined with other products to meet different cement specifications. In this flow sheet the rejects are further treated by grinding and roasting them and then magnetically separating them to remove the Fe₃O₄ and Al₂O₃ concentrates. The balance of the rejects or middlings are conveyed to suitable storage bins. These three products, i. e., concentrates and middlings from the rejects and combined concentrates and dust, may be suitably combined and conveyed by the kiln feed conveyor to a point where the final grinding and mixing may be completed. As indicated this final grinding and mixing step reduces the minerals to the desired size and at the same time intimately mixes them.

Figure 13:
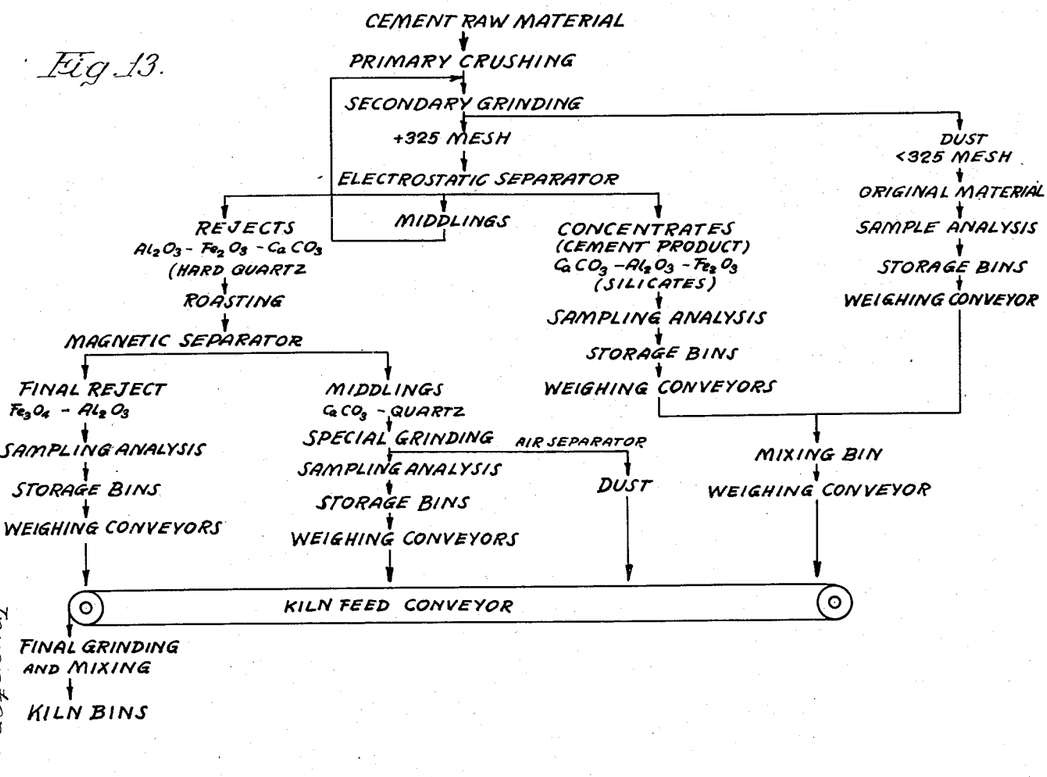

The flow sheet as shown in Figure 13 of the drawings is similar to that shown in Figure 12. However, in this flow sheet the special grinding of the rejects before roasting is omitted. After the roasting the rejects are magnetically separated into a final reject containing pricipally Fe₃O₄ and Al₂O₃ and a middlings product composed principally of CaCO₃ and quartz. The middlings are specially ground and dust is removed therefrom by any suitable means such as air separators. The various products may then be combined in the proportions desired to meet various cement specifications. After being deposited on the kiln feed conveyor the minerals are finely ground and mixed, as previously described, and then sent to the kiln bins.

It will now be obvious that this invention provides a highly flexible dry process for manufacturing cement. The recombination steps are, for all practical purposes, disassociated from the concentrating steps. Thus, the "run-of-mine" rock may be regularly processed and the dust and concentrated CaCO₃, SiO₂ and Al₂O₃ products may be separately stored. Since the quantity and analysis of each product is known, it is a routine matter for the cement chemist to make the necessary recombinations to meet different cement specifications. Thus, the cost of operation of many dry process plants is reduced and at the same time they are capable of more easily meeting different cement specifications. Likewise, many plants that have been abandoned because of high cost operation can be reopened and lower grade deposits of cement rock made available.

Since it is obvious that many changes may be made in the separation of the cement minerals without departing from the scope of the present invention, it is intended that all matter conained in the foregoing description or shown in the accompanying drawings shall be interpreted as illustrative and not in a limiting sense.

I claim as my invention:

1. In the method of manufacturing cement, the steps which comprise: passing finely divided cement raw material between a pair of continuously rotating electrodes maintained at a high difference of uni-directional voltage and in close proximity to one of them, separating the finely divided cement raw material into a plurality of discrete portions by the selective action of the electrostatic field between the electrodes, and individually collecting the separated portions.

2. In the method of manufacturing cement, the steps which comprise: passing finely divided cement raw material between a pair of continuously rotating electrodes maintained at a high difference of uni-directional voltage in close proximity to the negative electrode, separating the finely divided cement raw material into a plurality of discrete portions by the selective action of the electrostatic field between the electrodes, and individually collecting the separated portions.

3. In the method of manufacturing cement, the steps which comprise: passing finely divided cement raw material between a pair of continuously rotating electrodes maintained at a high difference of uni-directional voltage in close proximity to the positive electrode, separating the finely divided cement raw material into a plurality of discrete portions by the selective action of the electrostatic field between the electrodes, and individually collecting the separated portions.

4. In the method of manufacturing cement from finely divided cement raw material composed principally of an $SiO_2$ group and a $CaCO_3$ group, the steps which comprise: passing the finely divided cement raw material between a pair of continuously rotating electrodes maintained at a high difference of uni-directional voltage and in close proximity to the positive electrode, separating the finely divided cement raw material into said groups with the $CaCO_3$ group being repelled from the positive electrode further than the $SiO_2$ group, and individually collecting the separated groups.

5. In the method of manufacturing cement from finely divided cement raw material composed principally of a $CaCO_3$ group and an $SiO_2$ group, the steps which comprise: passing the finely divided cement raw material between a pair of continuously rotating electrodes maintained at a high difference of uni-directional voltage and in close proximity to the negative electrode, separating the finely divided cement raw material into said groups with the $SiO_2$ group being repelled from the negative electrode further than the $CaCO_3$ group, and individually collecting the separated groups.

6. In the method of manufacturing cement from finely divided cement raw material composed principally of an $SiO_2$ group, a $CaCO_3$ group, and an $Al_2O_3$ group, the steps which comprise: passing the finely divided cement raw material between a pair of continuously rotating electrodes maintained at a high difference of uni-directional voltage and in close proximity to the positive electrode, separating the finely divided cement raw material into said groups in the order named with the $SiO_2$ group nearest the positive electrode, and individually collecting the separated groups.

7. In the method of manufacturing cement from finely divided cement raw material composed principally of a $CaCO_3$ group, an $SiO_2$ group, and an $Al_2O_3$ group, the steps which comprise: passing the finely divided cement raw material between a pair of continuously rotating electrodes maintained at a high difference of uni-directional voltage and in close proximity to the negative electrode, separating the finely divided cement raw material into said groups in the order named with the $CaCO_3$ group nearest the negative electrode, and individually collecting the separated groups.

8. In the method of manufacturing cement from finely divided cement raw material composed principally of an $SiO_2$ group and a $CaCO_3$ group, the steps which comprise: successively passing the finely divided cement raw material between a plurality of pairs of continuously rotating electrodes maintained at a high difference of uni-directional voltage and in close proximity to the positive electrodes, separating the finely divided cement raw material into said groups with the $CaCO_3$ group being repelled from each positive electrode further than the $SiO_2$ group, and individually collecting the separated groups.

9. In the method of manufacturing cement from finely divided cement raw material composed principally of a $CaCO_3$ group and an $SiO_2$ group, the steps which comprise: successively passing the finely divided cement raw material between a plurality of pairs of continuously rotating electrodes maintained at a high difference of uni-directional voltage and in close proximity to the negative electrodes, separating the finely divided cement raw material into said groups with the $SiO_2$ group being repelled from each negative electrode further than the $CaCO_3$ group, and individually collecting the separated groups.

10. In the method of manufacturing cement, the steps which comprise: successively passing finely divided cement raw material between a plurality of pairs of continuously rotating electrodes maintained at a high difference of uni-directional voltage and in close proximity to the negative electrodes, separating the finely divided cement raw material into a plurality of discrete portions, removing at least one of the separated portions, successively passing the balance of the finely divided cement raw material between a plurality of pairs of continuously rotating electrodes maintained at a high difference of uni-directional voltage and in close proximity to the positive electrodes, separating the balance of the finely divided cement raw material into a plurality of discrete portions, and individually collecting the last named separated portions.

11. In the method of manufacturing cement, the steps which comprise: successively passing finely divided cement raw material between a plurality of pairs of continuously rotating electrodes maintained at a high difference of uni-directional voltage and in close proximity to the positive electrodes, separating the finely divided cement raw material into a plurality of discrete portions, removing at least one of the separated portions, successively passing the balance of the finely divided cement raw material between a plurality of pairs of continuously rotating electrodes maintained at a high difference of unidirectional voltage and in close proximity to the negative electrodes, separating the balance of the finely divided cement raw material into a plurality of discrete portions, and individually collecting the last named separated portions.

12. In the method of manufacturing cement from finely divided cement raw material composed principally of a $CaCO_3$ group and an $SiO_2$ group, the steps which comprise: successively passing the finely divided cement raw material between a plurality of pairs of continuously rotating electrodes maintained at a high difference of uni-directional voltage and in close proximity to the negative electrodes, separating the finely divided cement raw material into said groups with the $SiO_2$ group being repelled from each negative electrode further than the $CaCO_3$ group, removing said $CaCO_3$ group, successively passing said $SiO_2$ group between a plurality of pairs of continuously rotating electrodes maintained at a high difference of uni-directional voltage and in close proximity to the positive electrodes, separating said $SiO_2$ group into rejects and middlings with the middlings being repelled from each positive electrode further than the rejects, individually collecting the rejects and middlings, and returning the middlings to be reprocessed.

13. In the method of manufacturing cement from finely divided cement raw material composed principally of an $SiO_2$ group and a $CaCO_3$ group, the steps which comprise: successively passing the finely divided cement raw material between a plurality of pairs of continuously rotating electrodes maintained at a high difference of uni-directional voltage and in close proximity to the positive electrodes, separating the finely divided cement raw material into said groups with the $CaCO_3$ group being repelled from each positive electrode further than the $SiO_2$ group, removing said $SiO_2$ group, successively passing said $CaCO_3$ group between a plurality of pairs of continuously rotating electrodes maintained at a high difference of uni-directional voltage and in close proximity to the negative electrodes, separating said $CaCO_3$ group into concentrates and middlings, individually collecting said concentrates and middlings, and returning said middlings to be reprocessed.

14. The method of separating a mixture of finely divided material comprising two groups each susceptible to opposite polarities into said groups which comprises: passing the mixture between a pair of electrodes maintained at a relatively high difference of uni-directional voltage and in close proximity to one of them to separate the same into said groups, controlling the relative positions of said groups by the relative polarities of said electrodes, and individually collecting the separated groups.

15. The method of separating a mixture of finely divided material comprising two groups each susceptible to opposite polarities into said groups which comprises: passing the mixture between a pair of continuously rotating electrodes maintained at a relatively high difference of uni-directional voltage and in close proximity to one of them to separate the same into said groups, controlling the relative positions of said groups by the relative polarities of said electrodes, and individually collecting the separated groups.

16. The method of separating a mixture of finely divided material comprising two groups each susceptible to opposite polarities and another group susceptible to either polarity into said groups which comprises: passing the mixture between a pair of continuously rotating electrodes maintained at a relatively high difference of uni-directional voltage and in close proximity to one of them to separate the same into said groups, controlling the relative positions of said two groups by the relative polarities of said electrodes while the position of said other group remains substantially unaffected, and individually collecting the separated groups.

17. In the method of manufacturing cement from finely divided cement raw material composed principally of an $SiO_2$ group and a $CaCO_3$ group, the steps which comprise: passing the finely divided cement raw material between a pair of electrodes maintained at a high difference of uni-directional voltage and in close proximity to one of them to separate the same into said groups, controlling the relative positions of said groups by the relative polarities of said electrodes, and individually collecting the separated groups.

18. In the method of manufacturing cement from finely divided cement raw material composed principally of an $SiO_2$ group, a $CaCO_3$ group, and a $Al_2O_3$ group, the steps which comprise: passing the finely divided cement raw material between a pair of electrodes maintained at a high difference of uni-directional voltage and in close proximity to one of them, separating the finely divided cement raw material into said groups with the $Al_2O_3$ group furthest from said one electrode regardless of the polarity of said electrodes, controlling the relative positions of the $SiO_2$ group and the $CaCO_3$ group by the relative polarities of said electrodes, and individually collecting the separated groups.

19. In the method of manufacturing cement, the steps which comprise: feeding finely divided cement raw material between a pair of electrodes maintained at a high difference of uni-directional voltage and in close proximity to one of them to separate the same into a plurality of discrete portions, removing at least one of the separated portions, feeding the balance of the finely divided cement raw material between a pair of electrodes maintained at a high difference of uni-directional voltage and in close proximity to the electrode having a polarity opposite to the polarity of the electrode in close proximity to which the material is first fed to separate the same into a plurality of discrete portions, and individually collecting the last named separated portions.

20. The method of separating a mixture of finely divided material comprising two mineral groups each susceptible to opposite polarities and one of said groups being composed principally of $SiO_2$ which comprises: passing the mixture between a pair of continuously rotating electrodes maintained at a relatively high difference of uni-directional voltage and in close proximity to one of them to separate the same into said groups, controlling the relative positions of said groups by the relative polarities of said electrodes, and individually collecting the separated groups.

HERBERT B. JOHNSON.